United States Patent Office
3,202,682
Patented Aug. 24, 1965

3,202,682
SYNTHETIC PIGMENTS OF THE ANTHRA-
QUINONE TYPE
Chi K. Dien, Williamsville, N.Y., and Charles F. Douty,
Pittsburgh, Pa., assignors to Allied Chemical Corpora-
tion, New York, N.Y., a corporation of New York
No Drawing. Filed July 27, 1961, Ser. No. 127,112
1 Claim. (Cl. 260—371)

This invention relates to a new class of synthetic organic pigments and, more particularly, to a new class of synthetic organic pigments of the anthraquinone type.

The production of acid wool dyes of the anthraquinone type by condensing bromamine acid (1-amino-4-bromoanthraquinone-2-sulfonic acid) with various amines is known. Thus, for example, it is known to condense bromamine acid with (a) certain aliphatic monoamines (U.S. Patent, 1,735,147 granted November 12, 1929); (b) hydroarylamines (U.S. Patent 1,821,043 granted September 1, 1931); (c) primary aromatic amines (U.S. Patent 1,131,516 granted March 9, 1915); (d) aromatic diamines (U.S. Patent 1,957,599 granted May 8, 1934); and (e) hydroaromatic diamines (U.S. Patent 2,740,796 granted April 3, 1956). Acid wool dyes thus prepared are soluble in their reaction media, in water, in dilute acid, and in dilute alkali and hence are totally unsuited for use as pigments.

It is a principal object of the present invention to provide a new class of synthetic organic pigments.

Other objects and advantages of the present invention will be apparent from the following detailed description thereof.

In accordance with this invention, pigments are prepared by condensing a bromamine component with a diamine component having the following structural formula:

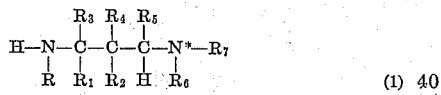

(1)

in which R is hydrogen or an alkyl group having from 1 to 4 carbon atoms, inclusive; $R_1$ and $R_2$ are each hydrogen, an alkyl group having 1, 2 or 3 carbon atoms, or part of a cycloaliphatic ring containing 6 annular carbon atoms; $R_3$ and $R_4$ are hydrogen or an alkyl group containing 1, 2 or 3 carbon atoms, but must be hydrogen when $R_1$ and $R_2$ are part of a cycloaliphatic ring; $R_5$ is hydrogen, methyl or ethyl; $R_1$, $R_2$, $R_3$, $R_4$ and $R_5$ contain collectively not more than 10 carbon atoms; $R_6$ is hydrogen, an alkyl group containing from 1 to 4 carbon atoms, inclusive, or is combined with $R_7$ to form a closed piperidine ring including the nitrogen atom designated as $N^*$; and $R_7$ is an alkyl group containing from 1 to 4 carbon atoms, inclusive, or is combined with $R_6$ to form a closed piperidine ring including the nitrogen atom designated as $N^*$.

The "bromamine acid" components include so-called "broamine acid" (1-amino-4-bromo-anthraquinone-2-sulfonic acid), its chlorine analogue (1-amino-4-chloro-anthraquinone-2-sulfonic acid), derivatives of either wherein the amino nitrogen attached to the anthraquinone nucleus at the 1 position contains an alkyl, cycloalkyl, aryl or aralkyl substituent, and derivatives of any of the above wherein the heteronucleus of the anthraquinone residue (i.e., positions 5, 6, 7 or 8 thereof) is substituted by non-solubilizing substituents. The broamine acid component has the structural formula:

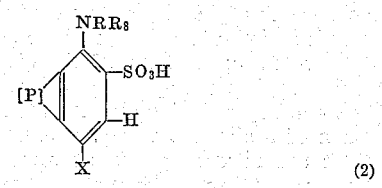

(2)

in which R is identified above and $R_8$ is hydrogen, an alkyl group having from 1 to 4 carbon atoms, a phenyl group, an alkyl substituted phenyl group containing not more than 4 aliphatic carbon atoms, a cyclohexyl group, an alkyl substituted cyclohexyl group containing not more than 4 aliphatic acyclic carbon atoms, and a naphthyl group; X is bromo or chloro; and [P] is a phthaloyl radical free from solubilizing substituents, e.g., carboxyl and sulfonic acid groups.

The pigment precursors have the following structural formula:

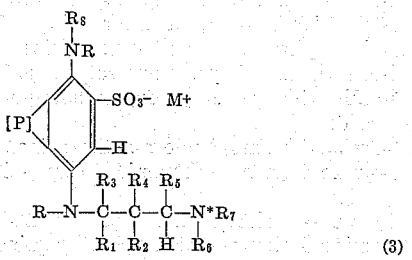

(3)

in which P, R, $R_1$, $R_2$, $R_3$, $R_4$, $R_5$, $R_6$, $R_7$ and $R_8$ are the substituents hereinabove set forth, and M is an alkali metal or a quaternary ammonium ion.

The pigments of the present invention are aminesulfonate salts wherein the anionic and cationic components are bonded to anthraquinone nuclei at the 2 and 4 positions and are believed to have the following structural formula:

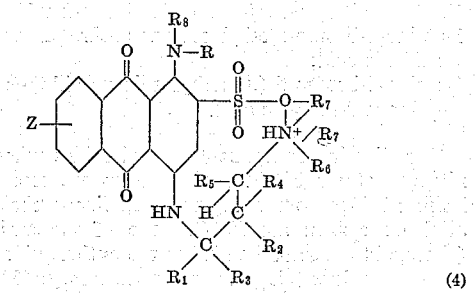

(4)

in which Z is hydrogen or a non-solubilizing substituent, such as alkyl sulfone, dialkyl sulfonamido, $\alpha$-nitro, Cl, Br, OH, $OR_9$, $NH_2$, $SR_9$, $SO_2NH_2$, $SO_2NHR_9$, $NH \cdot COR_9$; $R_9$ is alkyl, cycloaykyl, aryl or aralkyl; and R, $R_1$, $R_2$ . . . through $R_8$, inclusive, are the substituents above identified.

The pigments of the present invention are characterized by brilliant and beautiful colors in the blue to purple range; high inherent color strength; insolubility in organic solvents such as methanol, ethanol, monoethyl ether of diethylene glycol, dichlorobenzene and nitrobenzene; insolubility in aqueous hydrochloric acid, 50° aqueous sulfuric acid, and aqueous sodium bicarbonate; exceptional bleed fastness in plastics; and exceptional light fastness. The pigments are soluble in strong alkali solutions, e.g., sodium hydroxide, potassium hydroxide and quaternary ammonium hydroxides, such as tetramethyl ammonium hydroxide (($CH_3$)$_4$N$^+$OH$^-$) and benzyl trimethylammonium hydroxide ($C_5H_5CH_2 \cdot (CH_3)_3$N$^+$OH$^-$)

They dissolve 10% by weight aqueous tetramethyl ammonium hydroxide solutions and when such solutions are acidified to a pH of 10, they precipitate.

It is an important feature of the present invention that the two nitrogen atoms of the diamine substituent attached to the anthraquinone nucleus at the 4-position are separated by a linking bridge consisting of a linear open chain of 3 aliphatic carbon atoms. Homologues where these two nitrogen atoms are separated by chains of 2 or 4, rather than 3 carbon atoms, are not pigments at all, but rather colorants resembling the known acid wool dyes. It is indeed suprising and unexpected that the pigments of the present invention should be pigments at all, as distinguished from water-soluble dyestuffs, such as the acid wool dyes of the anthraquinone type obtained, for bromamine acid with various amines.

"Bromamine acid" components which may be used to prepare pigments in accordance with the process of the present invention include the following:

1-amino-4-bromo-anthraquinone-2-sulfonic acid;
1-amino-4-chloro-anthraquinone-2-sulfonic acid;
1-methylamino-4-bromo-anthraquinone-2-sulfonic acid;
1-dimethylamino-4-bromo-anthraquinone-2-sulfonic acid;
1-benzylamino-4-bromo-anthraquinone-2-sulfonic acid;
1-amino-4-bromo-8-hydroxy-anthraquinone-2-sulfonic acid;
1-amino-4-bromo-6-chloro-anthraquinone-2-sulfonic acid;
1-amino-4-bromo-5-acetamido-anthraquinone-2-sulfonic acid;
1-amino-4,7-dibromo-anthraquinone-2-sulfonic acid;
1-amino-4-bromo-8-methoxy-anthraquinone-2-sulfonic acid;
1-amino-4-bromo-8-methylmercapto-anthraquinone-2-sulfonic acid;
1,5-diamino-4-bromo-anthraquinone-2-sulfonic acid;
1-amino-5-anilido-4-bromo-anthraquinone-2-sulfonic acid;
1-amino-4-bromo-7-sulfonamido-anthraquinone-2-sulfonic acid;
1-amino-4-bromo-7-(N-methyl sulfonamido)-anthraquinone-2-sulfonic acid;
1-amino-4-bromo-5-nitroanthraquinone-2-sulfonic acid;
1-amino-4-bromo-5-ethyl sulfone-anthraquinone-2-sulfonic acid;
1-amino-4-bromo-6-(dimethyl sulfonamido)-anthraquinone-2-sulfonic acid.

The diamine components are diamines where (1) the nitrogen atoms of the amino group are separated by a linking bridge comprising an open linear chain of three aliphatic carbon atoms; (2) one of the amine groups (destined to become bonded to the anthraquinone nucleus at the 4-position) is primary or secondary; (3) the other amine group (destined to form the cation of the amine-sulfonate salt characterizing the pigment) is secondary or tertiary; and (4) the amine nitrogen groups are not bonded to aromatic carbon atoms or to heterocyclic ring systems containing other hetero atoms (e.g., morpholine).

The amine group of the diamine component which is destined to become bonded to the anthraquinone nucleus at the 4-position thereof must be primary or secondary in character because a tertiary amine group, lacking a hydrogen capable of forming HBr or HCl under reactions conditions, could not undergo the condensation reaction. Primary amine groups undergo this reaction more readily than the secondary amine groups and hence it is preferred that one of the amine groups shall be primary. The amine group of the diamine component which is destined to be attached to the distal end of the 3 carbon chain and form the cation of the amine-sulfonate salt bond, should, as noted above, be secondary or tertiary in character. Primary amines are apparently not strongly basic enough.

Examples of diamine components which may be used to prepare pigments in accordance with the process of the present invention include the following:

N,N-dimethyl-1,3-propanediamine;
N,N-diethyl-1,3-propanediamine;
N-methyl-1,3-prepanediamine;
N-isopropyl-1,3-propanediamine;
3-dimethylamino-butylamine;
2-methyl,3-dimethylamino-butylamine;
N-methyl,N',N'-dimethyl-1,3-propanediamine;
o-(N,N-dimethylaminomethyl)cyclohexylamine;
N-piperidyl-1,3-propanediamine.

The reaction is carried out by heating the reactants in an aqueous alkaline madium and in the presence of a copper catalyst. The catalyst comprises copper metal, a copper salt such as copper sulfate or copper chloride, or mixtures thereof. A weakly alkaline reaction medium, such as an aqueous sodium bicarbonate solution, is generally preferred (to avoid hydrolysis of the bromine or chlorine from the anthraquinone nucleus). During the condensation reaction, the "bromamine acid" component is present, of course, as a dissolved salt rather than as a free acid. If the condensation is carried out, as is preferred, in a weakly alkaline medium, the pigment product precipitates out as formed.

The synthesis of a representative pigment precursor and pigment by condensing bromamine acid with N,N-dimethyl-1,3-propanediamine in the presence of a copper-copper sulfate catalyst in an aqueous sodium bicarbonate solution reaction medium may be represented by the following equations:

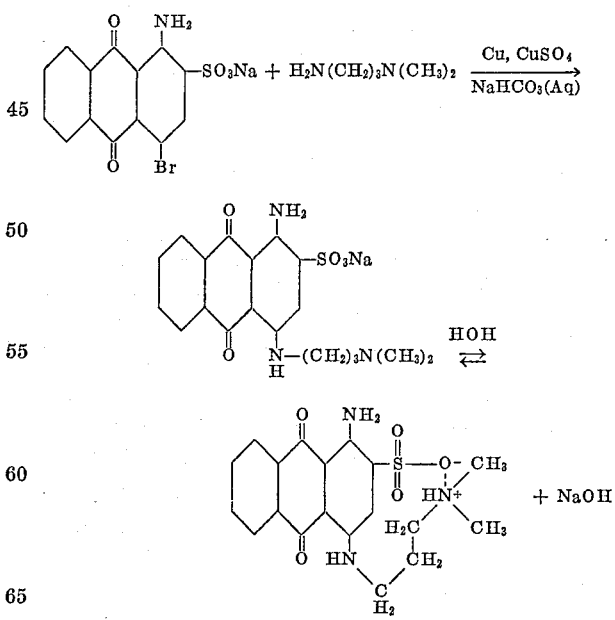

The above formula of the pigment is given to facilitate a better understanding of the invention and is based on stereochemical considerations which suggest that the ring has the quasi-bihexagonal configuration indicated in the structural formula for the pigment form. It will be appreciated, however, that the invention is not to be limited to any particular theory of structural relationship involving the amine sulfonate linkages or to the above given structural formula for the pigment form from the precursor (1-amino-4-(3-dimethylamino propylamino)anthraquinone-2-sodium sulfonate).

The following examples are given for the purpose of illustrating a preferred manner of carrying out the process of producing the pigment precursors and pigments embody the present invention as well as these products. It will be understood, however, that the invention is not limited to these examples. In these examples, degrees are in degrees centigrade and all percentages and parts are on a weight basis.

*Example I*

A solution prepared from 1-amino-2-sulfo-4-bromoanthraquinone (60 parts), sodium bicarbonate (12 parts) and water (300 parts) was charged with N,N-dimethyl-1,3-propanediamine (30 parts) and copper powder (0.6 part). The resulting mixture was heated to 80° and slowly charged with 1.5 parts of copper sulfate. The batch was then heated at 90–95° for a 5-hour period during which purple crystals gradually precipitated out. It was then cooled to 50° and filtered. The filter cake was washed with 5% aqueous salt solution, until the effluent wash liquor was colorless, and then dried. A yield of 60.9 parts of product (95.6% of theory) was obtained.

The product was a reddish-blue pigment which was insoluble in water, aqueous HCl, aqueous NaHCO₃, glacial acetic acid and organic solvents, e.g., methanol, ethanol, "Carbitol" (monoethyl ether of diethylene glycol), dichlorobenzene and nitrobenzene. It was soluble in 95% sulfuric acid and 5% aqueous NaOH. It re-precipitated from NaOH solution upon addition of acid thereto, although it was not necessary to add enough acid to impart an acid reaction to the mother liquor.

When the pigment was incorporated into polyethylene and polyvinyl chloride, beautiful reddish-blue colorations of exceptional brilliance, color strength, bleed-fastness and light-fastness were obtained. In the standard light-fastness test carried out in a "Fade-O-Meter" according to the method of the American Association of Textile Chemists and Colorists, no detectable change in color strength or shade was noted until the exposure period exceeded 180 hours in the case of pigmented polyvinyl chloride and 310 hours in the case of pigmented polyethylene. Accordingly, the standard light-fastness rating of the pigment is 8, the highest rating in the standard scale.

*Example II*

The procedure of Example I was repeated except that N,N-diethyl-1,3-propanediamine was used in the place of N,N-dimethyl-1,3-propanediamine. The product was a pigment resembling that of Example I except that it was redder in shade.

*Example III*

A mixture prepared from 1-amino-2-sulfo-4-bromo anthraquinone (200 parts), sodium bicarbonate (50 parts), N-isopropyl-1,3-propanediamine (110 parts), copper powder (5 parts) and copper sulfate (5 parts), and water (2000 parts) was heated at 85–90° for a three hour period during which blue crystals precipitated out. The product was isolated by filtration and washed successively with water, 5% HCl solution, and water, and dried. A blue pigment (145 parts) was recovered, which was soluble in 5% aqueous NaOH solution but was insoluble in aqueous HCl, aqueous Na₂CO₃ and various organic solvents (methanol, ethanol, "Carbitol," o-dichlorobenzene, and nitrobenzene).

*Example IV*

A mixture prepared from 1-amino-2-sulfo-4-bromo anthraquinone (300 parts), sodium bicarbonate (50 parts), N-methyl-1,3-propanediamine (80 parts), copper metal powder (5 parts) and water (2000 parts) was heated at 85–95° for a three hour period. The batch was cooled and filtered to isolate the product, which was washed successively with 5% aqueous HCl solution and water. A blue pigment (85 parts) was recovered which was soluble in 5% aqueous NaOH solution but was insoluble in aqueous HCl, aqueous Na₂CO₃, and various organic solvents (methanol, ethanol, "Carbitol," o-dichlorobenzene and nitrogenzene).

*Example V*

Thirty parts of sodium 5-acetamido-1-amino-4-bromoanthraquinone-2-sulfonate (obtainable from 1,5-diaminoanthraquinone by sulfonation, acetylation and bromination as disclosed in P.B. Report 82232, Frame 910) were charged into 300 parts of water containing 6 parts of sodium bicarbonate. The mixture was agitated until homogeneous, and 20 parts of N,N-dimethyl-1,3-propanediamine, ½ part of copper powder and 1 part copper sulfate were then added. The resulting mixture was heated to boiling and refluxed for several hours. The mass was then cooled and filtered. The filter cake was washed with warm water until alkali-free. The product thus obtained was an insoluble blue pigment having good light-fastness in polyethylene, of exceptional brilliance, color strength and bleed fastness.

*Example VI*

Twenty parts of sodium 1-amino-4-chloroanthraquinone-2-sulfonate prepared as disclosed in United States Patent 1,914,433 were added slowly to a solution of 6 parts of sodium bicarbonate in 150 parts of water. The mixture was agitated for 10 minutes and charged with 12 parts of N,N-dimethyl-1,3-propanediamine, 0.3 part of copper powder and 0.5 part of copper sulfate. The resulting mass was heated to boiling and refluxed for 6 hours, and then cooled to room temperature. The product was filtered off, washed with warm water until alkali-free and dried. The pigment thus obtained with the same as that produced in Example I.

It is to be understood that this invention is not restricted to the present disclosure otherwise than as defined by the appended claim.

What is claimed is:

A pigment produced by heating in an aqueous alkaline medium a bromamine acid component having the formula:

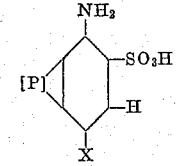

wherein, P is selected from the group consisting of the phthaloyl radical and the 3-acetamido-phthaloyl radical; and X is a radical selected from the group consisting of bromo and chloro; with a diamine component having the formula:

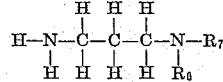

wherein, $R_6$ is selected from the group consisting of hydrogen and an alkyl group having from 1 to 4 carbon atoms; and $R_7$ is an alkyl group having from 1 to 4 carbon atoms; precipitating the resultant pigment reaction product, said precipitation of the pigment taking place directly as the pigment is formed when the reaction is carried out in a weakly alkaline medium in which the pigment is insoluble and being effected by acidification of the reaction mixture when the reaction is carried out in a strongly alkaline medium in which the pigment is soluble, and separating the precipitated pigment from the reaction mixture.

References Cited by the Examiner

UNITED STATES PATENTS

| | | | |
|---|---|---|---|
| 2,022,678 | 12/35 | Kritchevsky | 260—373 X |
| 2,038,298 | 4/36 | Kiernan | 260—373 X |
| 2,245,780 | 6/41 | Heinrich | 260—374 X |
| 2,315,870 | 4/43 | Nadler | 260—374 X |
| 2,333,137 | 11/43 | Zerweck et al. | 260—374 |
| 2,490,703 | 12/49 | Paige | 260—374 X |
| 2,716,655 | 8/55 | Boyd | 260—381 |

FOREIGN PATENTS

| | | |
|---|---|---|
| 807,241 | 1/59 | Great Britain. |
| 483,155 | 9/29 | Germany. |
| 122,594 | 10/27 | Switzerland. |

LORRAINE A. WEINBERGER, *Primary Examiner.*

CHARLES B. PARKER, LEON ZITVER, *Examiners.*